Feb. 12, 1929.

A. L. MOLER 1,701,819

BUSHING

Filed July 29, 1926

Abraham L. Moler, Inventor

By Edwin S. Clarkson, his Attorney

Patented Feb. 12, 1929.

1,701,819

UNITED STATES PATENT OFFICE.

ABRAHAM L. MOLER, OF RICHMOND, VIRGINIA.

BUSHING.

Application filed July 29, 1926. Serial No. 125,733.

While my improved bushing has been designed as a side rod bushing for locomotive engines, it is of course understood that its use is not limited to that application, as it is equally efficient in any and all types of bearings.

Bushings universally used for side rods of locomotive engines are known to be objectionable in that when subjected to high running temperature they rigidly seize the pin whenever it becomes overheated and again the brass becomes loose in the rod whenever it becomes overheated from any cause.

The object of my invention is, broadly stated, to provide the bearing face of the bushing with interruptions whereby the bushing may expand and contract without destructive effort.

A further object of my invention is to use these interruptions as storage spaces for a lubricant from which the lubricant is expelled and supplied to the bearing when said interruptions close under expansion of the bearing face of the bushing.

My invention consists of a bushing having an interrupted bearing surface.

Figure 1:
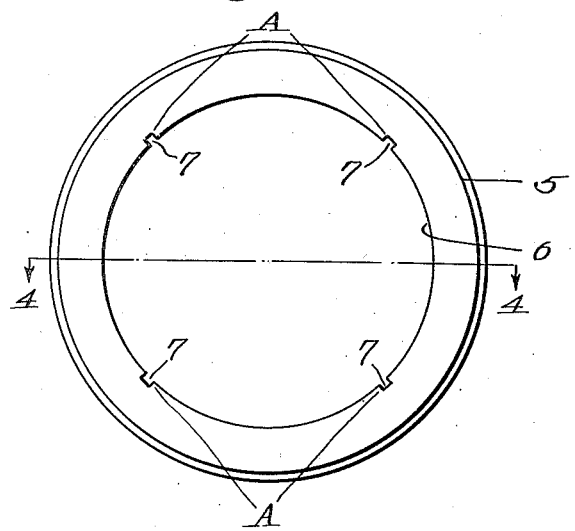
Figure 1 is an end elevation of my improved bushing.
Figure 3:
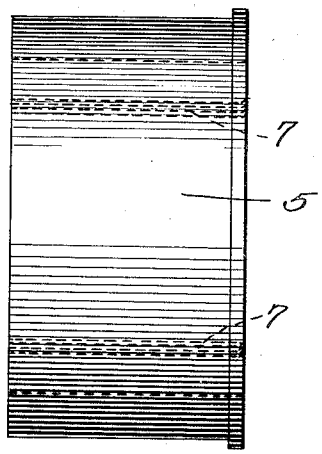
Figure 3 is a side elevation of the bushing.
Figure 2:
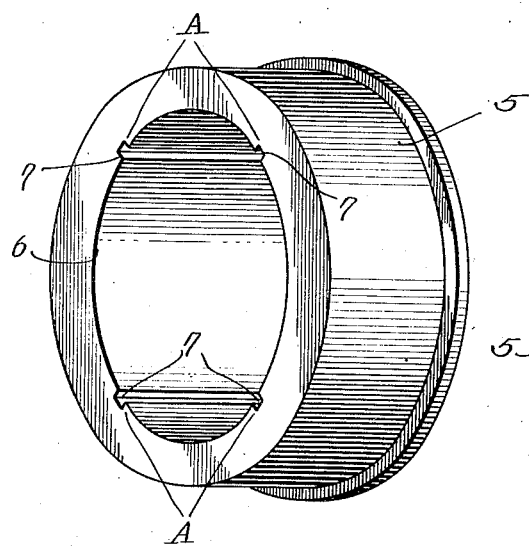
Figure 2 is a perspective view of the same.
Figure 4:
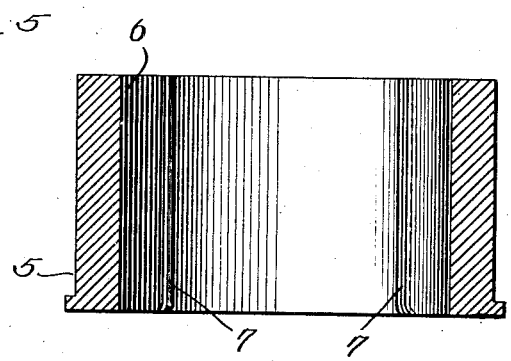
Figure 4 is a sectional view on the line 4—4 of Figure 1 looking in the direction of the arrows.

The reference numeral 5 designates my improved bushing, which may be of any size or shape to adapt it to the bearing to which it is intended to be applied. The bushing shown in the drawing is especially adapted for use as a locomotive engine side rod bushing. This bushing has a constant exterior diameter which is unaffected by the expansion of the inner face of the bushing between the grooves 7, thus minimizing the tendency of the bushing to become loose in its mounting. The grooves may expand and contract without destructive effort and without affecting the exterior diameter of the bushing.

According to my invention the bearing face 6 of the bushing is provided with interruptions, extending from end to end of the bushing, which for purposes of illustration I have shown in the form of grooves 7, parallel with each other throughout their length.

While I believe that it is necessary that the grooves be parallel to prevent undue torsional stress in the bearing face 6, and prefer such arrangement of the interruptions, at the same time I do not wish to be limited to such arrangement if it be found that other arrangements of the grooves is practical or desirable.

In these grooves 7 I pack a suitable lubricant whereby when the crank pin to which the side rod is secured becomes heated from any cause, the expansion grooves 7 close more, or less, thereby squeezing an extra supply of lubricant to the pin wearing surfaces; in this connection it is to be noted that I have equipped some 300 locomotive engines with my improved bushing and there has not been a single instance of a loose bushing or a "stuck" pin, in these installations; it is also to be noted that the temperature in these installations has never increased above normal, in view of all of which my improved bushing is now standard equipment on one of the large railway systems in this country.

The importance and economic value of my improved bushing will be appreciated from the fact that since the use of my bushing the railroad system, above referred to, is now saving from two to three tons of brass each month which heretofore was lost by the brass becoming loose in rod, necessitating renewal.

What I claim is:

1. A bushing having a constant exterior diameter, grooves formed in the inner face of the bushing and opening through the ends of the bushing whereby the metal of the inner face between the grooves may expand without destructive effort and without affecting the exterior diameter of the bushing, thus preventing the bushing from becoming loose in its mounting.

2. A bushing having a constant exterior diameter, grooves formed in the inner face of the bushing and opening through the ends of the bushing whereby the metal of the inner face between the grooves may expand without destructive effort and without affecting the exterior diameter of the bushing, thus preventing the bushing from becoming loose in its mounting, and a supply of lubricant in said grooves, whereby said lubricant is supplied to the bearing when the walls of said grooves move under expansion of the metal of the said inner face.

In testimony whereof I affix my signature.

ABRAHAM L. MOLER.